United States Patent Office 3,006,703
Patented Oct. 31, 1961

3,006,703
NEEDLE BEARINGS
Emil Bensch, Herzogenaurach, near Nurnberg, Germany, assignor to Industriewerk Schaeffler O.H.G., Herzogenaurach, near Nurnberg, Germany, a German company
Filed May 27, 1958, Ser. No. 738,195
Claims priority, application Germany May 31, 1957
1 Claim. (Cl. 308—212)

This invention relates to needle bearings.

Needle bearings comprising a cage and a race worked without cutting and having formed-on rims, have become widely used to a constantly increasing degree owing to their small dimensions in the radial sense and owing to their advantageous production cost. As compared with plain bearings, they have the advantage of substantially reduced friction, more simple lubrication, and freedom from wear, without requiring substantially greater space in the radial direction than is known with other anti-friction bearings.

Despite the known advantages, in many cases the use of these needle bearings instead of plain bearings has not been adopted simply on grounds of expense. This attitude has already led to the known construction of a bearing comprising a race worked without cutting and a cage having punched windows and intermediate webs situated only within the pitch circle. This attitude has also led to the use of windowed cages made of synthetic plastic material for use with such needle bearings. Plastic windowed cages require quite complicated tools or time-consuming processes for their manufacture.

According to the present invention there is provided a needle bearing comprising a metal sleeve, a radially extending flanged-over hardened rim at one end of the sleeve, said sleeve and rim together constituting a race, cylindrical needles having convex terminal portions at opposite ends thereof, and a cylindrical cage made of plastic material positioned coaxially with said sleeve between said rim and the end of the sleeve opposite the rim, said cage having an end ring and circumferentially spaced prongs extending axially from said end ring towards the rim of said sleeve, said prongs each having along opposite sides thereof axially extending concave surfaces, the concave surfaces of adjacent prongs defining between said adjacent prongs substantially cylindrical pockets in which said needles are rotatably disposed.

If transport and fitting conditions permit, the needle race can be used with one end open, the other end being formed with the hardened rim. But it simplifies handling if the open end of the race is bent-over after insertion of the cage. In this way the bearing can be handled as a closed assembly, and no further discs or sliding surfaces are required for use as abutments. However, the end ring of the comb-like cage may bear directly against the bent-over rim. Since the comb-like cage is made of synthetic plastic material, the bent-over rim, which is non-hardened, is well suited as an axial abutment.

Now, having regard to the small cross-sections such as are required for bearing needles with a given small diameter and such a considerable length, plastic cages made in the form of comb-like cages exhibit comparatively little rigidity. Therefore it is possible for needles to move into oblique positions. It is therefore advantageous, similarly to what is done in the case of bearings wherein there is no cage and wherein a continuous ring of needles is used, to ensure that the offset positions which may occur do not lead to jamming of the bearing. Expediently, this is achieved by keeping the outer raceway diameter to less than 20 mm. and the relative ratio between the outer raceway diameter and bearing play adequately high (preferably not less than 1:500) so that the possibility of the needles taking up oblique positions which is permitted by the cage construction cannot lead to jamming of the needles.

For a better understanding of the invention and to show how the same may be carried into effect, reference will now be made to the accompanying drawings, in which.

In all four figures, corresponding parts have been denoted by the same reference numerals.

Figure 1:
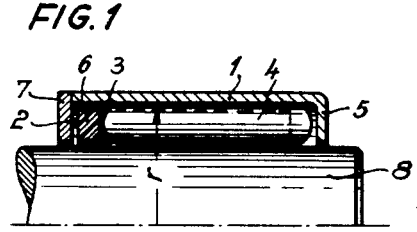
FIGURE 1 is an axial sectional view of a needle bearing in accordance with one embodiment of the invention.

Referring to FIGURE 1, the bearing comprises a race 1 and a comb-like cage 3 with needles 4 arranged inside the race 1. The race 1 is formed from a sleeve which is worked without cutting to define at one end a formed-on or integral hardened rim 5, the opposite end 2 remaining open for insertion of the cage 3 and needles 4. The cage 3 comprises an end ring 6 from which circumferentially spaced prongs, which have a length less than the length of the needles, extend axially for spacing the needles 4 from one another. Axial movement of the needles 4, which have rounded ends, is limited at one end by the hardened rim 5 and at the other end by the end ring 6 of the cage 3. To prevent axial displacement of the cage 3, an annular or disc-like abutment 7 is arranged on the shaft 8 on which the race 1 is mounted, which abutment bears against the open end 2 of the race.

Figure 2:
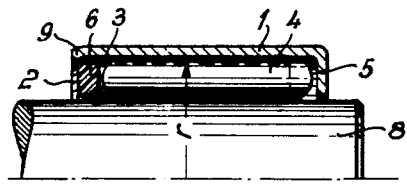
FIGURE 2 is an axial sectional view of another embodiment of the invention.

However it is more advantageous if the needle bearing is put on the market as a closed assembly, since especially during transport it is disadvantageous if one end of the bearing is open and is only closed when the bearing is fitted by means of an annular abutment or some other bearing surface. For this purpose, as shown in FIGURE 2, the cage 3 and needles 4 are prevented from falling out of the race 1 by slightly bending over the edge 9 of the open end 2 of the race. The end ring 6 of the comb-like cage 3 then can abut against the bent-over edge 9 of the race 1.

Figure 3:
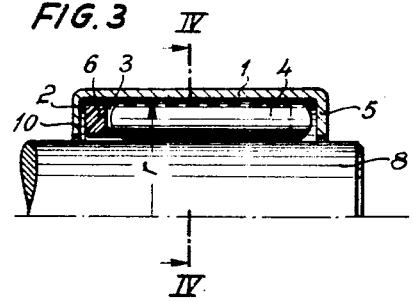
FIGURE 3 is an axial sectional view of a further embodiment of the invention.

A further form of embodiment according to the invention is illustrated in FIGURE 3. The end 2 of the race 1 is provided with a fixed rim 10 which is produced after the cage 3 and needles 4 are inserted so as to prevent the cage 3 and the needles 4 from falling out of the race. The inner side of the rim 10 at the same time serves as an abutment surface for the end ring 6 of the cage.

Figure 4:
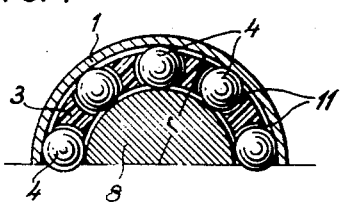
FIGURE 4 is a cross-sectional view taken on the line A—A of FIGURES 1 to 3.

As FIGURE 4 shows, radial displacement of the cages 3, which are made of synthetic plastic material, relatively to the needles 4 is limited by shaping the lateral boundary surfaces 11 of the pockets of the cage to conform to the cylindrical shape of the needles. It will be noted in FIGURES 1 to 3 that the length of the axially extending elements of the cages 3 is less than the length of the needles 4.

The outer raceway diameter, half of whose length is designated as $r$ in the figures, should not exceed 20 mm. Also, the ratio between the outer raceway diameter ($2r$) and the bearing play should be adequately high (preferably not less than 1:500) so that oblique positions of the needles, such as is possible as a result of the cage construction, cannot lead to jamming of the needles.

I claim:

A needle bearing comprising a metal sleeve, a radially extending flanged-over hardened rim at one end of the sleeve, said sleeve and rim together constituting a race, cylindrical needles equidistantly spaced one from another having convex terminal portions at opposite ends thereof, and a cylindrical cage made of plastic material positioned co-axially with said sleeve between said rim and the end of the sleeve opposite the rim, said cage having an unbroken annular end ring and circumferentially spaced prongs of the same number as said needles equidistantly spaced one from another extending axially from said end ring towards the rim of said sleeve, said prongs each having along opposite sides thereof axially extending concave surfaces, the concave surfaces of adjacent prongs defining between said adjacent prongs substantially cylindrical pockets in which said needles are rotatably disposed, said needles at one end facing said rim and extending beyond the distal ends of said prongs, and the main annular wall of the race at the end of the race opposite to said rim having an inwardly extending flanged over portion to retain said cage and needles.

References Cited in the file of this patent

UNITED STATES PATENTS

| | | |
|---|---|---|
| 71,973 | Burnap | Dec. 10, 1867 |
| 2,038,474 | Brown | Apr. 21, 1936 |
| 2,819,129 | Slick | Jan. 7, 1958 |

FOREIGN PATENTS

| | | |
|---|---|---|
| 425,141 | Italy | Sept. 13, 1947 |
| 938,452 | Germany | Feb. 2, 1956 |
| 959,699 | Germany | Mar. 7, 1957 |
| 772,218 | Great Britain | Apr. 10, 1957 |